Oct. 14, 1952 R. D. DREW ET AL 2,613,924

HEATER

Filed March 7, 1947 3 Sheets-Sheet 1

FLUE GAS OUTLET

ROBERT D. DREW and
ERIC V. BERGSTROM
INVENTORS

BY
ATTORNEY

Oct. 14, 1952 R. D. DREW ET AL 2,613,924
HEATER
Filed March 7, 1947 3 Sheets-Sheet 2
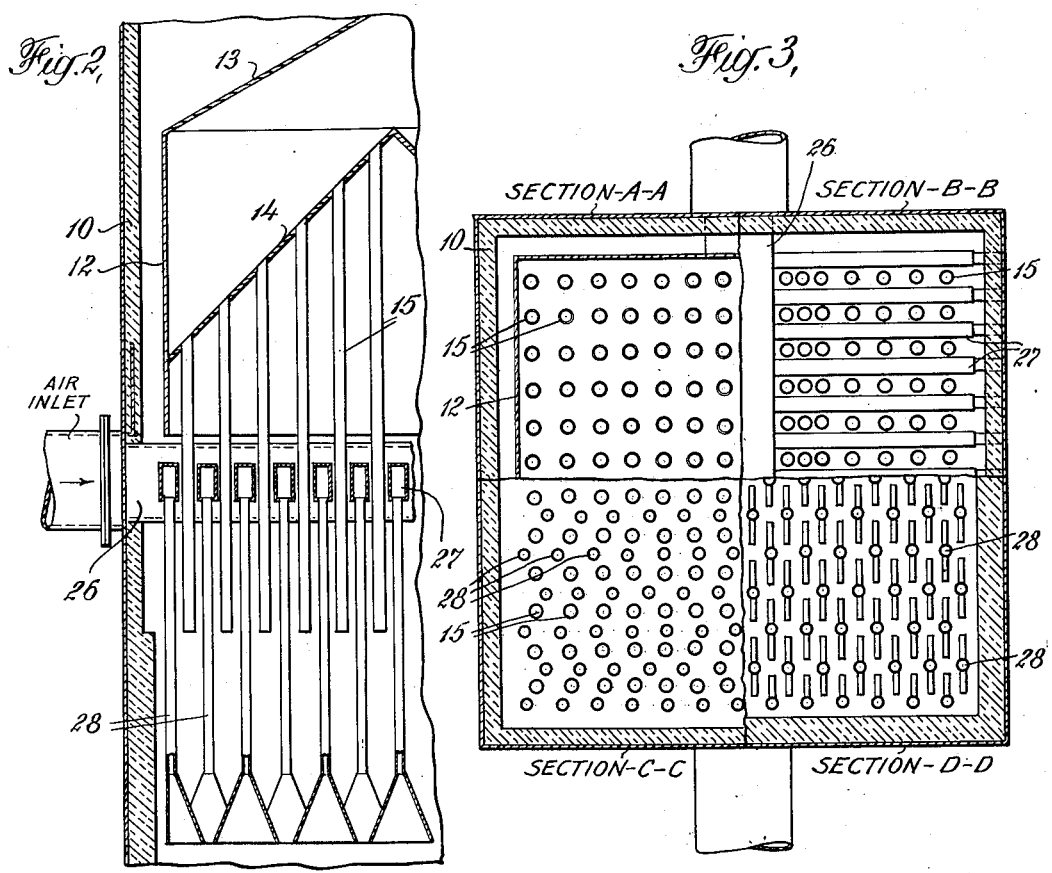
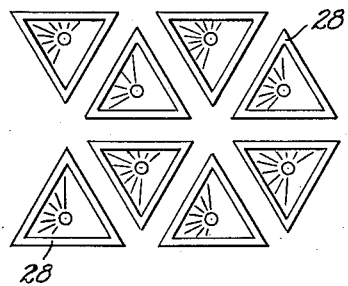
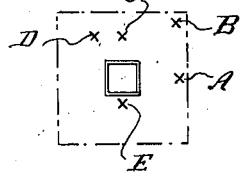
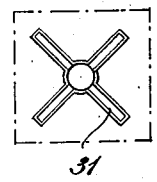
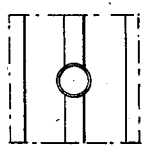
ROBERT D. DREW and
ERIC V. BERGSTROM
INVENTORS
BY Oswald G. Hayes
ATTORNEY

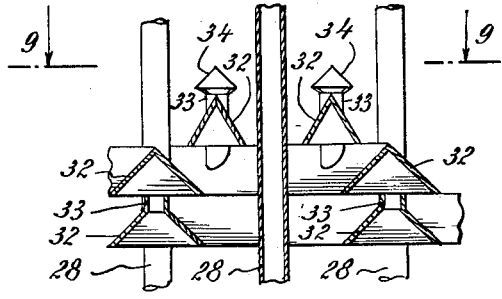
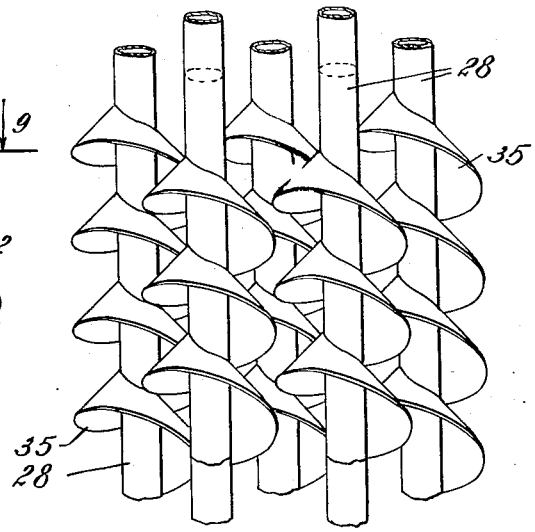
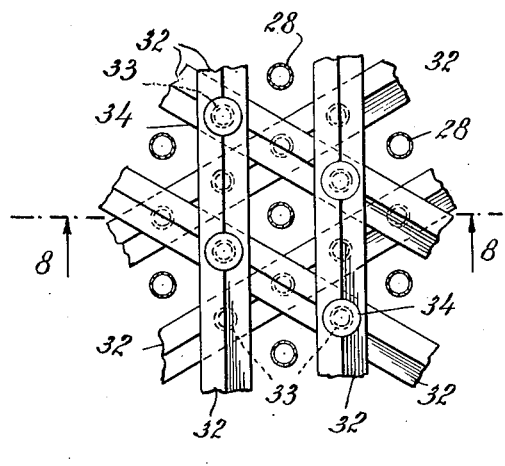
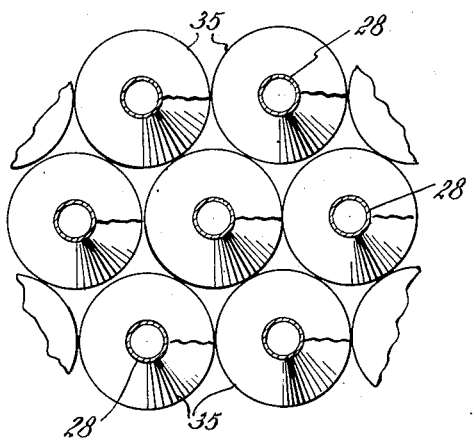
ROBERT D. DREW and
ERIC V. BERGSTROM
INVENTORS Patented Oct. 14, 1952

2,613,924

UNITED STATES PATENT OFFICE 2,613,924

HEATER

Robert D. Drew, Wenonah, and Eric V. Bergstrom, Short Hills, N. J., assignors to Socony-Vacuum Oil Company, Incorporated, a corporation of New York Application March 7, 1947, Serial No. 733,012

2 Claims. (Cl. 263—19)

This invention relates to process and apparatus for heating a granular solid heat transfer agent continuously and efficiently.

Heat may be advantageously applied to a desired fluid rapidly and efficiently by contact of the fluid with a highly heated granular solid. Thus, many chemical reactions are advantageously conducted at very high temperatures for very short reaction times and effective reaction time can be maintained within a desirably short period by flowing reactant fluids in direct contact with a highly heated solid heat transfer agent. This avoids the manifold difficulties which arise when it is attempted to transfer heat through a wall of a reaction shell or tube by indirect heat transfer from a fluid heating medium.

This type of reaction is typified by the conversion of heavy hydrocarbons to high yields of olefins such as ethylene by reacting the charge at temperatures upwards of 1500° F. for reaction times of about 0.2 second. Attempts to achieve the desired rapid heating to avoid extensive reaction at low temperature during the heating period in tubes or shell stills results in excessive depositions of coke and the like on the heat transfer surfaces, thus destroying a part of the charge without production of the valuable product and seriously impairing the heat transfer rate.

These difficulties are overcome when the charge is passed through a bed of granular solid heat transfer material continuously supplied at a desirably high temperature. It is the primary object of this invention to provide a method and apparatus for continuously heating granular solids to desirably high temperatures in an efficient manner. The invention contemplates burning of fuel in the presence of air within a substantially compact downwardly moving bed of granular solid heat transfer agent and passing the burning mixture upwardly through the bed counter current to the direction of flow of solids.

A principal difficulty in such operations is the obtaining of adequate mixing between fuel and air without the use of excessively deep beds of granular solid. Contrary to what might be expected, the flow of the gases through a bed of granular solids does not give immediate and complete mixing. This is particularly true where the two gases are involved in an exothermic reaction such as the combustion of gaseous fuel. The rapid combustion occurring in the zone of mixing results in expansion of the burning gases with consequent hindering of the mixing operation. This not only results in a loss of potential heat values of the fuel, but also gives a flue gas high in combustible material which may burn in the flues, thus causing excessive temperatures which burn out flue elements.

The present invention contemplates the provision of means and a method of mixing whereby the mixture of fuel and air in a burner of the type referred to is greatly improved. This is accomplished by introducing a gaseous fuel to a low point in the moving bed of granular solids and introducing preheated air at a higher point to mix with the fuel and pass upwardly through the bed. The air is introduced by pipes extending down into the bed and flared at their lower ends. The resultant narrow path for gas flow results in bringing the air and gas streams into close proximity, thus improving mixing. Preferably the air is introduced by pipes extending downwardly into the bed and having their lower ends flared to occupy a greater area than the main portion of the pipes. The flared ends of the pipes are formed with straight sides in cross section and the pipes are so arranged that adjacent sides of flared ends are parallel to each other. In a specific embodiment found to be particularly advantageous, the pipes are arranged in staggered rows so that the gaps between flared ends of adjacent pipes in one row are overlapped by the flared ends of pipes in the next row.

Still greater advantages are obtained by the use of baffles in an intermediate portion of the bed arranged to baffle the downwardly moving solids to produce a plurality of continuous tortuous passages through the bed but free of granules in the said passages. The incompletely reacted gas mixture is thus removed from flowing through the mass of particles and its temperature rises due to decreased heat transfer from the gases to the solids. This increase in temperature aids in obtaining complete combustion since such materials as carbon monoxide are thereby consumed. If desired, the tortuous passages may be intercommunicating to obtain increased mixing in the baffled region.

These and other objects and advantages of the invention are more clearly brought out hereinafter in discussion of specific embodiments of the invention shown in the annexed drawings wherein:

Figure 2 is a section on line 2—2 of Figure 1;

Figure 3 is a plan view in multiple partial section showing horizontal views of the heater in section at lines A—A, B—B, C—C and D—D of Figure 1;

Figure 4 is a plan view from below showing a modified arrangement of the flared tube ends;

Figures 5, 6 and 7 are illustrative of three types of tube endings compared for their mixing effect;

Figure 8 is a fragmentary vertical section of a modified form of heater having baffles in the flame path;

Figure 9 is a section on line 9—9 of Figure 8;

Figure 10 is a fragmentary view showing a second type of baffling arrangement; and Figure 11 is a fragmentary horizontal section of the baffling arrangement shown in Figure 10.

Figure 1:
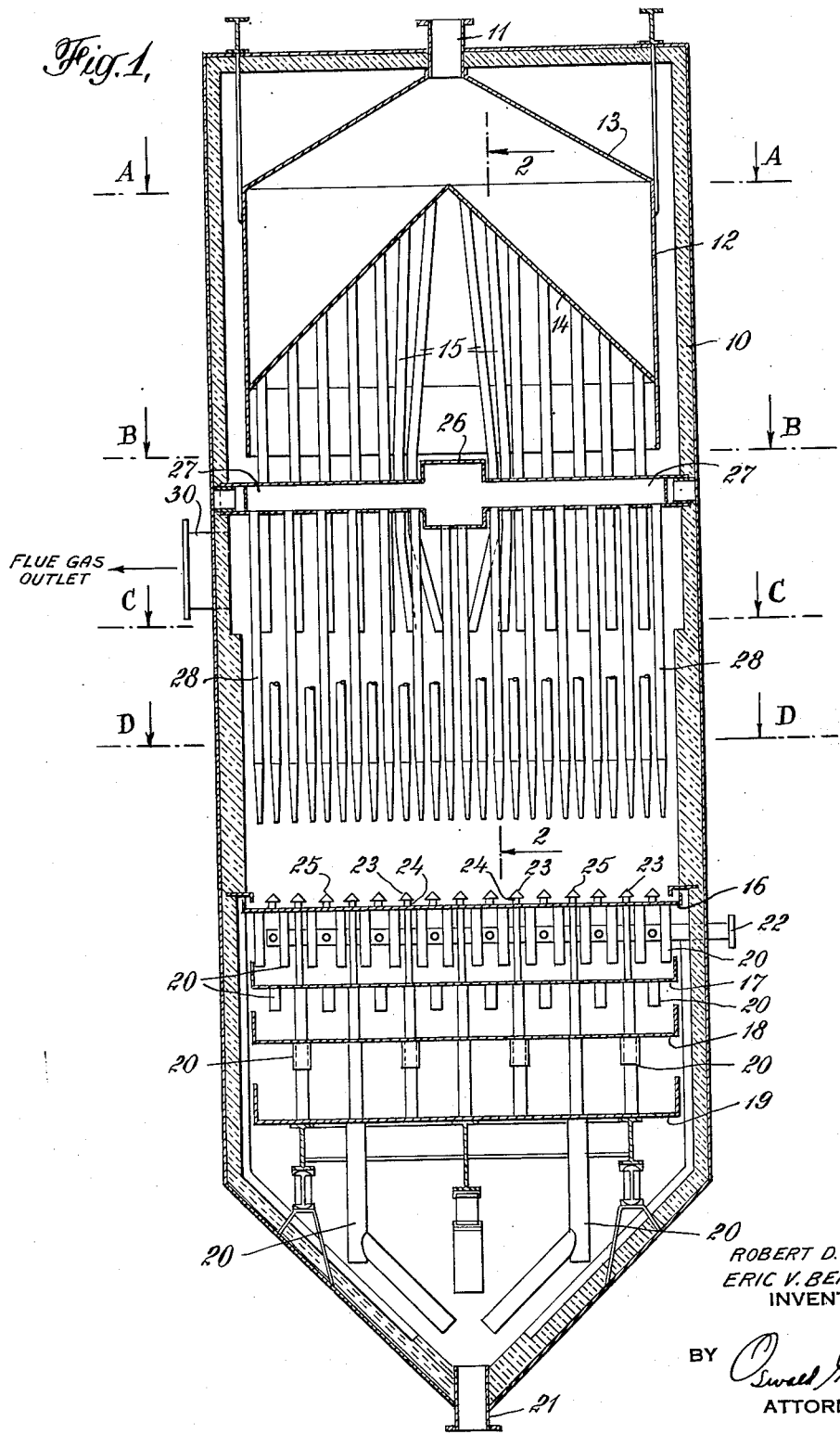
Figure 1 is an elevation in section of a heater embodying the principles of the invention.

Referring now to Figure 1, there is shown a vertical shell indicated generally at 10 and suitably insulated to reduce loss of heat by radiation. A granular solid heat transfer material such as refractory granules having an average diameter of about 1/3 inch is introduced at pipe connection 11 to a hopper defined by the vertical walls 12, upwardly tapered top 13 and upwardly tapered bottom 14. A plurality of granular solid feed pipes 15 extend downwardly from the upwardly tapered bottom 14 to a heating zone within the shell 10. Near the bottom of the shell 10 are a plurality of flow control plates designated as 16, 17, 18 and 19 to induce uniform withdrawal across the bottom of the shell 10. Each of these flow control plates is fitted with suitable nipples 20 through which the solids are withdrawn from above the top of the respective plates. The nipples 20 are so arranged that each of them draws uniformly from a group of four nipples in the next plate thereabove, thus insuring uniformity of flow. The nipples 20 on plate 19 discharge to a central point in the bottom of shell 10 from which granular solids are transferred by outlet 21 to suitable apparatus for use.

A suitable fuel gas is introduced across shell 10 above the upper flow control plate 16 by any suitable means such as inlet manifold 22 and vapor distributing elements 23. In this embodiment a gaseous fuel enters the space between plate 16 and the layer of solids on plate 17, which space acts as a plenum chamber. If desired, steam may be advantageously admitted with the gaseous fuel. The fuel or fuel and steam mixture passes upwardly through a chimney 24 of distributor 23 and downward flow of solids through the chimney is inhibited by conical caps 25.

Air is introduced to the shell 10 by a header 26 from which a number of manifolds 27 extend towards the sides of the shell 10. Each of the manifolds 27 is fitted with a plurality of drop tubes 28 through which the air is fed downwardly into the bed for distribution and mixing with the gaseous fuel. It will be readily understood that air in the drop pipes 28 is pre-heated by passing downwardly in indirect heat exchange relationship with the hot granules and the burning gases within shell 10. The mixture of air and fuel burns as it passes upwardly toward the top of the bed at the lower ends of pipes 15 at which point it is disengaged from contact with the granular solids and discharged from the shell 10 by flue connection 30.

The lower ends of the pipes 28 are flattened in one direction and greatly flared in another to effect maximum degree of distribution of air throughout the cross section of the bed.

The staggered arrangement of tube endings is well shown in Section D of Figure 3, which illustrates how the gaps between tubes are overlapped by adjacent tube endings. In general, the flared tube endings should be arranged with straight sides of adjacent tubes parallel to each other. A modified type of arrangement is shown in Figure 4 wherein the flared tube endings are generally triangular in outline and arranged in a hexagonal pattern.

Figures 5, 6 and 7 illustrate various possible tube endings which have been run experimentally to determine their mixing effect. In Figure 5 the tube ending is square and has about the same cross sectional area as the feed pipe 28. In Figure 6 the tube ending is provided with fins 31 which are made hollow in order to get distribution of gases throughout the area covered by the fins. Figure 7 shows an arrangement which simulates the construction shown in Figures 1, 2 and 3, in that it represents a section of unit area generally similar in construction to a portion of the heater shown in Figures 1, 2 and 3. This unit area can be used for pilot plant scale testing in that the conditions existing throughout a column above the unit area will be substantially the same as those in unit columns in the full scale apparatus. These three arrangements were operated to mix air and carbon dioxide and taps were taken at various points within the bed about four feet above the bottom of the tube. The gaseous mixture withdrawn by these taps was analyzed for carbon dioxide as an indication of adequacy of mixing. The position of the taps is indicated by the characters A, B, C, D and E in Figure 5. Taps were taken at similar representative points in the constructions indicated in Figures 6 and 7 and the results obtained are shown below in the table:

*Table*

| Tube Ends | Tube Spacing | Percent $CO_2$ at 4 foot level (representative points) | | | | | |
|---|---|---|---|---|---|---|---|
| | Inches | | | | | | |
| Fig. 5 | 12 | 18.9 | 4.5 | 3.5 | 2.5 | 0.8 | |
| Fig. 6 | 12 | 2.3 | 8.4 | 13.1 | 9.3 | 8.6 | |
| flared | 14 | 0.3 | 1.7 | 9.1 | 15.0 | 10.0 | 2.5 | 2.5 |
| Do | 11 | 0.7 | 4.3 | 12.3 | 12.0 | 10.3 | 3.4 | 0.7 |
| Do | 8 | 3.0 | 6.2 | 8.0 | 10.2 | 9.2 | 5.8 | 3.6 |
| Do | 5 | 7.1 | 8.1 | 9.1 | 9.8 | 9.7 | | |
| Do | 6.5 | 4.7 | 6.9 | 10.6 | 10.2 | 8.6 | 7.8 | 6.9 |

It will be seen that for comparable tube spacings, flared parallel sided tubes induce better mixing of the two gases. As might be expected, mixing is more complete with closer spacing of the tubes.

The heater shown in Figure 1 is designed with a seven foot depth of granular solid bed between outlets of the feed pipes 15 and the lower ends of the air inlet pipes 28. It is preferred that means be introduced at an intermediate point, say about halfway in this bed, to provide particle-free tortuous passages through a short portion of the bed for purposes noted above. As shown in Figure 8 a plurality of baffles in the form of angle irons 32, or suitable equivalent channel members such as refractory or alloy steel channels, are laid in among the air pipes 28. The angle irons 32 of different levels, three being shown here, are provided with chimneys 33 by means of which gases are passed from one angle iron to the angle iron thereabove. The mixture of gases enters the baffles 32 of the lowest level, flow therealong to chimney 33 by which they pass to the next upper baffle 32 to flow a